United States Patent Office 3,556,563
Patented Jan. 19, 1971

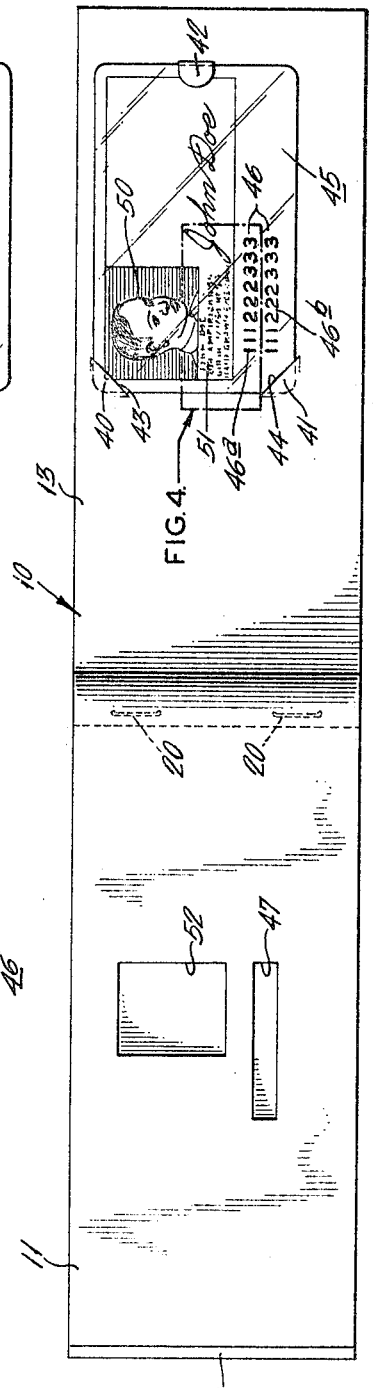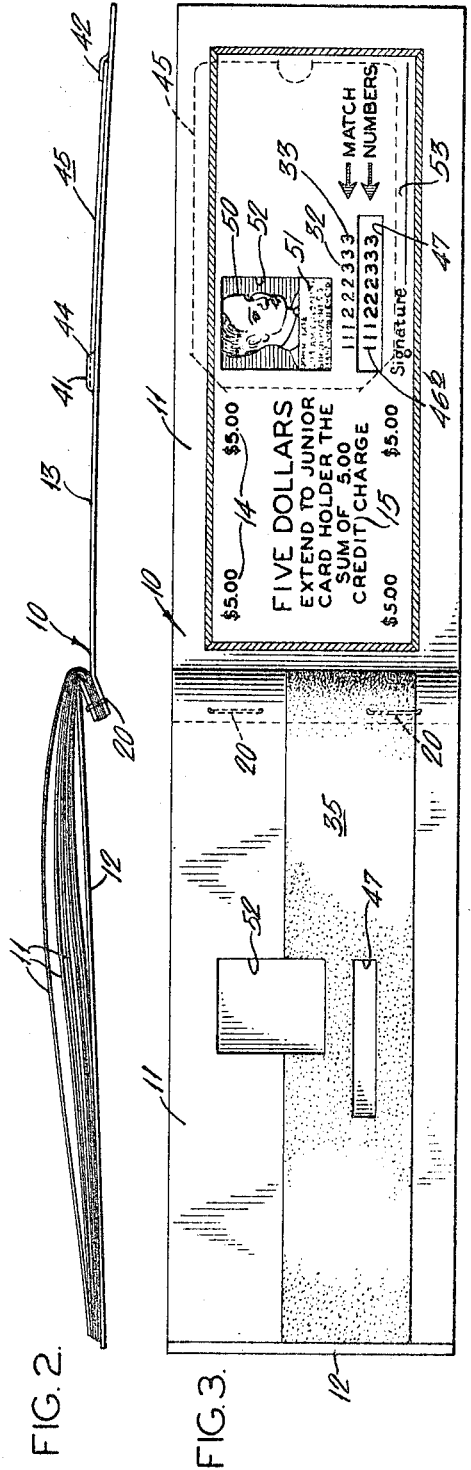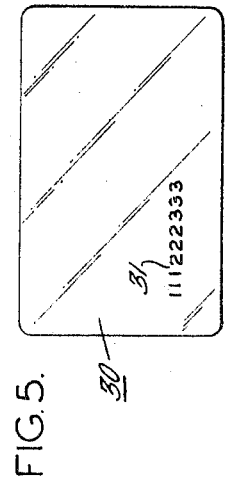

3,556,563
BOOKLET AND CARDS FOR USE IN A LIMITED CREDIT SYSTEM
Ronald L. Scheinberg, 519 Montgomery Ave., and Richard K. Page, 151 Cheswold Valley Road, both of Haverford, Pa. 19041
Filed July 9, 1969, Ser. No. 840,221
Int. Cl. B42d *15/00, 15/06;* B41n *1/00*
U.S. Cl. 283—7                                    10 Claims

ABSTRACT OF THE DISCLOSURE

A limited amount of merchandise or service may be charged against a person's established credit account by another person upon presentation to a shopkeeper of an identification card mounted in the back of a booklet which has a series of pages each of which represents a cash-value limit for a transaction. Each page is correlated with the established account by a facsimile of the account number which is imprinted on an area thereon when the booklet is procured, and each page has an aperture contiguous to the imprint area in which account indicia on the identification card registers to permit the shopkeeper to make a visual comparison of the indicia and to extend credit if the indicia match. In addition to the account indicia registering in the aperture, the identification card also has raised account indicia which underlies the imprint area on each page so that when the booklet and identification card are operated in a credit-receipt imprinting machine in a conventional manner, the facsimile on the imprint area is obliterated if the indicia do not match, thereby warning a shopkeeper of an improper transaction.

---

The present invention relates to credit card systems, and more particularly, the present invention relates to systems wherein limited amounts of credit may be extended to persons so that they may charge merchandise to the credit account of others.

At present, it may be customary in some families for parents to periodically give a small cash allowance to their children, and in some family situations, older or teenage children may be given a larger but limited amount of cash to permit them to purchase food, clothing and entertainment. In view of the possibility of loss or theft of the cash allowance, parents may not wish to entrust youngsters with the larger amounts of cash. However, in view of their minority, many vendors may be reluctant to extend credit to young persons to permit them to make purchases without cash.

Therefore, in view of the foregoing, it is a primary object of the present invention to provide novel identification means which may be used in conjunction with a conventional credit card to permit limited amounts of credit to be extended to a person other than the one in whose name the credit account has been established.

It is another object of the present invention to provide a credit system wherein persons in loco parentis may permit their wards to charge limited amounts of merchandise or service to their credit accounts.

More specifically, in the present invention, a booklet and an identification card are provided for use with a conventional credit card in a unique credit-account system wherein a person other than the one in whose name a credit account has been established may charge limited amounts of merchandise or service to the other's credit account. For this purpose, the booklet has a series of removable pages on which upper credit limits are printed and on which a facsimile of the credit account indicia is imprinted from the credit card on an imprint area adjacent an aperture therein by pressure-sensitive printing means associated with each page. The booklet also has a backer having means for selectively mounting and positioning either the credit card or the identification card thereon, the credit card having raised account indicia which underlies the imprint area when the credit card is mounted on the backer when the booklet is procured, and the identification card having two parallel rows of raised account indicia with one row underlying the imprint area and the other registering in the aperture in each page when the identification card is mounted on the backer to effect a limited credit purchase. The bearer of the booklet is entitled to receive credit up to the denominated limit on a selected page when the facsimile of the credit card indicia on the page matches the identification card indicia registering in the aperture and when the facsimile is not obliterated upon operating the booklet and identification card in a receipt-imprinting machine.

These and other objects, features and advantages of the present invention should become apparent from the following description when taken in conjunction with the accompanying drawing in which:

FIG. 1 is a plan view of a booklet employed in the present invention, the booklet having its pages folded leftward to illustrate its backer on which an identification card is mounted;

FIG. 2 is an elevational view of the booklet illustrated in FIG. 1;

FIG. 3 is a plan view of the booklet of FIG. 1 having a selected one of its pages overlying the identification card when mounted on its backer;

FIG. 4 is an enlarged fragmentary view of the account indicia on the identification card illustrated in FIG. 1; and FIG. 5 is a plan view of a credit card adapted for use in the present invention.

At present, it is customary for stores or service organizations to issue cards to selected patrons to thereby permit them to make purchases on credit. In some instances, it may be desirable to permit persons other than the one to whom the credit card is issued to purchase merchandise or service on the patron's credit account; for example, those in loco parentis may find it convenient to have means by which credit may be extended to their teenage children to permit the child to make purchases on the adult's account. However, in the absence of express parental consent and promise to pay, shopkeepers may not be disposed to extend credit to children. Therefore, in accordance with the present invention, means is provided which may be used by teenage children to permit them to charge limited amounts of merchandise or service against their parent's account while simultaneously assuring the shopkeeper that the amount of the purchase has parental consent and that the parents have authorized the credit purchase to be charged to their account. To this end, the parents of a teenager or child provide him with script bearing cash-value denominations which set the upper limit on the amount of credit to which the teenager is entitled. By prior agreement with the shopkeeper, possession of the script entitles the bearer thereof to credit up to the amount stated thereon, the parent thereby agreeing to accept charges up to the stated amount. The cash-value amount of the script may vary depending on the financial policy of the parent, the age of the child, and like considerations; however, for purposes of illustration five dollars is a suitable amount.

In order to facilitate the use of the script in effecting a limited-credit transaction and for carrying the script, the script is contained in the form of a booklet 10. As may be seen in FIGS. 1–3, the booklet 10 has a series of pages 11, 11 each of which corresponds to a predetermined denomination of script. In the present instance, the pages are bound together in the booklet between a flexible cover 12 and a carrier or backer 13 which is also flexible but which is stiffer than the pages 11, 11. Indicia 14 designating a denominated credit limit is printed or otherwise indicated on the left-hand side of each page, and if desired, instructional material 15 may also be printed thereon as an aide de memoire for a store clerk or shopkeeper.

According to the present invention, one page or sheet of script is used each time a limited-credit transaction is effected, the page being retained by the shopkeeper as a receipt for the transaction in the event that the propriety of the transaction should subsequently be questioned. For this purpose, each page 11 is removably mounted between the cover 12 and backer 13 by means of fasteners which, in the present instance, are a pair of staples 20, 20 extending through the cover and backer and the left-hand margin of each page. In this manner, any one of the pages may be selectively torn from the booklet. If desired, each page may be perforated along its fastened margin to further facilitate its removal from the booklet.

In accordance with customary practice, a credit account is given a number or other identifying indicia when the account is initially established. In addition, the person establishing the account is conventionally provided with a master credit card 30, the card being correlated to the account by embossed numeral or indicia 31 on its lower left-hand margin.

In the present invention, each page in the booklet is identified with the credit account. For this purpose, each page comprises a paper sheet having an identification or imprint area 32 on which is imprinted a facsimile 33 of the credit account numerals when the booklet is procured. The facsimile 33 is simultaneously imprinted on the area 32 of each page by pressure-sensitive printing means which overlies the area and which is associated with each page. In the present instance, the pressure-sensitive printing means is a strip of carbonaceous matter 35 disposed lengthwise on the reverse side of each page 11 and on the inside of the cover. Thus, when the credit card indicia is pressed against the back of the pages and the carbonaceous matter, or vice versa, a facsimile of the indicia is imprinted directly on the obverse or front side of each page.

For the purpose of positioning the credit card in the booklet so that its indicia underlies the imprint area 32 of each page, positioning means is provided on the backer. As may be seen in FIGS. 1 and 3, the positioning means comprises a series of tabs 40 and 41 formed integrally with the backer by a like series of slots 43 and 44. The tabs 40 and 41 engage across the left-hand corners of the card, and a tab 42 engages the card along its right-hand margin. Thus, with this arrangement, the credit card may be secured to the backer for imprinting the pages when the booklet is procured and the credit card may be readily removed therefrom after imprinting.

According to the present invention, the shopkeeper identifies the bearer of the booklet so that he may be assured that the bearer is properly entitled to receive the denominated amount of credit. For this purpose, an auxiliary identification card 45 is provided. As may be seen in FIGS. 1, 3 and 4, the auxiliary identification card is of substantially the same overall size as the master credit card and, like the master credit card, carries numerals or indicia 46 thereon which correlates it with the established credit account. In the present instance, the auxiliary card is distinguished from the master card by the presence of duplicate indicia 46 disposed in parallel rows 46a and 46b, the upper row 46a underlying the imprint area 32 and the lower row 46b registering in an aperture 47 in each page when the card is mounted on the backer. In this manner, the shopkeeper may readily compare the indicia appearing in the aperture with the facsimile on the imprint area. If the facsimile and indicia are identical, the bearer is entitled to receive a limited amount of credit; however, if the facsimile and indicia do not match, the bearer is not entitled to credit.

As an additional advantage, the present invention provides means by which a further check may be made on the bearer's identity. For this purpose, the indicia 46 on the identification card is raised. Thus, when the booklet is placed in a receipt-imprinting machine with a receipt and its carbon overlying a selected page in the booklet, the facsimile 33 is merely darkened if it is identical to the indicia on the identification card. However, if the facsimile is not identical to the indicia on the identification card, the facsimile in the identification area 32 is obliterated when the machine is operated to thereby warn the shopkeeper of an improper credit transaction.

The present invention may also be used to assist the shopkeeper in subsequent bookkeeping. For this purpose, an additional receipt slip is placed between two pages in the booklet before the booklet and the identification card are placed in a receipt-imprinting machine, the page underlying the receipt slip being the one selected for the transaction and the page overlying the receipt slip providing a carbon for imprinting the top sheet of the receipt slip so that when the imprinting machine is operated, a facsimile of both rows of account indicia is imprinted on the receipt slip. It is noted that since the second indicia is disposed within the aperture a clear impression of the indicia is imprinted on the receipt slip. Thus, the shopkeeper, in subsequent bookkeeping, may know that a limited-credit transaction has been effected merely by observing the presence of both rows of account indicia on the receipt slip.

If desired, the auxiliary identification card may also carry a photograph 50 and other identifying matter 51 thereon. In such a situation, an additional aperture 52 is provided in each page so that the photograph registers therein. In addition, a signature area 53 may also be provided on each page for receiving the signature of the identification card bearer if required by the shopkeeper.

In use, an adult procures the booklet 10 from a cooperating shopkeeper upon presentation of his master credit card 30. The shopkeeper mounts the card 30 in the backer 13 and places the booklet in a receipt-imprinting machine which operates to imprint a facsimile 33 of the cerdit account indicia on each page 11. After imprinting, the credit card 30 is removed from the booklet and is retained in the possession of the adult. The adult may then give the booklet 10 to this child who has previously been supplied with the auxiliary identification card 45.

When effecting a limited-credit transaction, the child mounts his identification card 45 in the booklet 10 and presents the booklet to the cooperating shopkeeper. The shopkeeper makes a preliminary inspection to determine whether the merchandise being purchased is less than the denominated credit limit 14 on a given page 11, and also to determine whether the facsimile 33 on the page matches the identification card indicia 46b registering in the aperture 47. If the indicia 46b matches the facsimile 33, the denominated credit limit is extended to the child. If the indicia does not match the facsimile, credit is refused to the child. After the preliminary inspection, the shopkeeper inserts the booklet in a receipt-imprinting machine with a receipt slip disposed between two selected pages in the booklet. Upon operating the machine, the shopkeeper may remove the booket therefrom and may make a secondary inspection of the facsimile 33. If the facsimile 33 is merely darkened after operation of the machine, the identification card indicia 46 matches the facsimile 33 and credit may be properly extended to the card bearer. If, however, the facsimile is obliterated upon operation in the machine, the facsimile does not match the indicia and credit may properly be refused to the card bearer. As his record of the transaction, the shopkeeper removes the given page 11 from the booklet 10 and retains one or more copies of the receipt slip. When engaged in subsequent bookkeeping, the shopkeeper may know which credit transactions have been made using the limited-credit system, since two rows of account indicia are printed on each receipt slip resulting from such a transaction.

In view of the foregoing, it should be apparent that novel means has now been provided by which a person may charge limited amounts of merchandise or service to the credit account of another.

While a preferred embodiment of the present invention has been described in detail, various modifications, alterations or changes may be made without departing from the spirit of the present invention.

What is claimed is:

1. For use with a master credit card and an auxiliary identification card in a limited credit system in which the bearer of the identification card may be extended limited amounts of credit for charging merchandise to the credit account of another, the credit card having raised account indicia thereon and the identification card also having account indicia, at least one imprint sheet having a selected area for receiving an imprinted facsimile of the credit card indicia and having an aperture contiguous to said area, carrier means releasably mounting said sheet and having positioning means to selectively mount said credit card and said identification card so as to position the raised account indicia of said credit card in registry with said selected area on said sheet when the credit card is mounted on the carrier and to position the account indicia on said identification card in registry with said aperture when said identification card is mounted on the carrier, and pressure-sensitive printing means associated with said selected area to print thereon said facsimile of said credit account indicia from said credit card when said credit card is mounted on said carrier and is pressed against said sheet, so that when the identification card is thereafter mounted on the carrier its indicia registers in the aperture with the imprinted facsimile of the account indicia adjacent thereto for enabling a shopkeeper to conveniently compare the indicia and identify the bearer before extending credit thereto.

2. Apparatus according to claim 1 wherein said carrier means includes a relatively stiff backer and said positioning means includes a plurality of tabs integral with said backer for engaging selected edge margins of said cards to position said cards on said backer.

3. Apparatus according to claim 2 including a stacked series of imprint sheets, a cover sheet disposed on said carrier overlying said stack of sheets and releasable securing means for said sheets including a fastener interconnecting said cover sheet and said backer through a margin of each sheet, so that selected sheets of said series may be torn from between the cover sheet and backer.

4. Apparatus according to claim 3 wherein said pressure-sensitive printing means is carried on the underside of each sheet to overlies and engage said selected area of an adjacent underlying sheet.

5. Apparatus according to claim 4 wherein said pressure-sensitive printing means includes a layer of carbonaceous material.

6. Apparatus according to claim 1 wherein said account indicia on said identification card is raised and is disposed in two parallel rows, one row registering in the aperture in each sheet and the other row underlying the facsimile printed on the area adjacent the aperture, so that when pressure-sensitive printing means overlies said area and said identification card is mounted on the carrier and is pressed thereagainst, a facsimile of the raised indicia on the identification card is printed over the facsimile of the credit card indicia to obliterate the previously imprinted facsimile if it does not match the raised indicia on the identification card.

7. Apparatus according to claim 6 wherein said credit card and said identification card are identically shaped, and one of said parallel rows on the identification card is spaced inwardly from the edges thereof a distance equal to the spaced distance between the indicia on said credit card and like edges thereof.

8. Apparatus according to claim 7 wherein said cards each have two corners and an edge spaced from said corners, and said card-positioning means engages said cards adjacent said corners and edge to mount said card on said carrier.

9. Apparatus according to claim 1 including means to indicate a denominated credit limit on each page.

10. A method of alerting a shopkeeper against an improper credit purchase comprising the steps of: positioning raised indicia of a credit card against an area on one side of a sheet of paper adjacent an aperture therein, placing pressure-sensitive printing means over said area on the other side of said sheet, pressing said credit card against said sheet and printing means to imprint a facsimile of said indicia to said area, removing said credit card from said positioning underlying said area, positioning raised indicia of an identification card in underlying registry with said area, placing said pressure-sensitive printing means over said area on said sheet, and pressing said identification card against said sheet and printing means, so that the facsimile on the sheet is obliterated if it does not match the identification card indicia to thereby alert the shopkeeper.

References Cited

UNITED STATES PATENTS

| | | | |
|---|---|---|---|
| 3,258,277 | 6/1966 | Schuster | 283—7X |
| 3,290,061 | 12/1966 | Glassman | 283—7X |

FOREIGN PATENTS

| | | | |
|---|---|---|---|
| 792,690 | 4/1958 | Great Britain | 101—369 |

LAWRENCE CHARLES, Primary Examiner

U.S. Cl. X.R.

282—23